United States Patent [19]

Maher et al.

[11] 4,264,495
[45] Apr. 28, 1981

[54] 2-THIENYL AZO DYESTUFF COMPOUNDS

[75] Inventors: Ronald J. Maher; John G. Fisher; Max A. Weaver, all of Kingsport, Tenn.

[73] Assignee: Eastman Kodak Company, Rochester, N.Y.

[21] Appl. No.: 253,633

[22] Filed: May 15, 1972

[51] Int. Cl.³ .................. C07C 107/04; C09B 29/033
[52] U.S. Cl. .................................. 260/152; 260/155; 260/156
[58] Field of Search .................. 260/152, 155, 156

[56] References Cited

U.S. PATENT DOCUMENTS

| 2,805,218 | 9/1957 | Towne et al. | 260/152 |
| 3,631,020 | 12/1971 | Weaver et al. | 260/152 X |
| 3,639,385 | 2/1972 | Weaver et al. | 260/152 X |

Primary Examiner—Charles F. Warren

Attorney, Agent, or Firm—Donald W. Spurrell; J. Frederick Thomsen

[57] ABSTRACT

Azo compounds having the formula

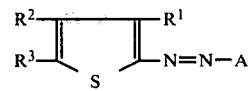

in which $R^1$ is cyano, aryl, an acyl radical or a carbamoyl radical, $R^2$ is hydrogen, alkyl, alkoxy, aralkyl or aryl, $R^3$ is alkyl, halogen, thiocyanato, arylazo or one of the substituents which $R^1$ can represent, and A is an aniline, tetrahydroquinoline, benzomorpholine or α-naphthylamine disperse azo dye coupling component. The azo compounds produce red to blue shades on polyamide, polyester and cellulose acetate fibers and exhibit improved fastness and dyeability properties on synthetic polyamide fibers.

18 Claims, No Drawings

2-THIENYL AZO DYESTUFF COMPOUNDS

This invention concerns certain novel azo compounds and polyamide textile materials dyed therewith. More particularly, this invention concerns monoazo disperse dyes containing novel thiophene diazo components.

Our novel compounds have the general formula

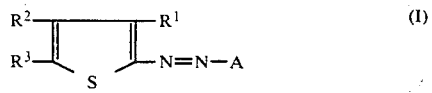

wherein
- $R^1$ is cyano, aryl, lower alkanoyl, aroyl, lower alkoxycarbonyl, lower hydroxyalkoxycarbonyl, lower alkoxy-lower-alkoxycarbonyl, or the group $-CONR^4R^5$
  in which $R^4$ individually is hydrogen, lower alkyl, cyclohexyl, lower alkylcyclohexyl, cyclohexylmethyl, lower alkylcyclohexylmethyl, lower hydroxyalkylcyclohexylmethyl, aryl-lower-alkyl, or aryl; $R^5$ individually is hydrogen or lower alkyl; and $R^4$ and $R^5$ in combination are pentamethylene or ethyleneoxyethylene;
- $R^2$ is hydrogen, lower alkyl, lower alkoxy, aryl-lower-alkyl or aryl;
- $R^3$ is lower alkyl, halogen, thiocyanato, arylazo, or a group which $R^1$ can represent;
- A is an aniline, 1,2,3,4-tetrahydroquinoline, benzomorpholine or α-naphthylamine disperse azo dye coupling component;

in which each aryl moiety is phenyl or phenyl substituted with lower alkyl, lower alkoxy, halogen, lower alkanoylamino, cyano or lower alkoxycarbonyl.

The azo compounds of the invention produce red to blue shades on polyamide, polyester and cellulose acetate fibers, yarns and fabrics when applied thereto according to conventional disperse dyeing procedures. Our azo compounds are especially valuable for dyeing synthetic polyamide fibers on which the compounds exhibit good to excellent dyeability and fastness properties, such as fastness to light and washing. The good dyeability of our compounds is manifested by the level shades they produce on synthetic polyamide fibers and their ability to build, i.e., produce significantly heavier shades as increased amounts of dye are applied to a given weight of undyed fibers. This desirable combination of properties which our azo compounds exhibit renders them especially valuable for dyeing carpets made from synthetic polyamide fibers and distinguishes them from known azo compounds containing a thiophene diazo component.

The substituents represented by $R^1$, $R^2$ and $R^3$ are well known in the art and can be derived from known intermediates by published procedures. Examples of these substituents are contained in the detailed description of the couplers represented by A and in the examples. It is generally preferred that the substituents which $R^3$ can represent are selected from the group consisting of aryl, cyano, lower alkanoyl, aroyl, lower alkoxycarbonyl, or the group $-CONHR^4$. Particularly preferred thienyl diazo components are those in which $R^1$ is lower alkoxycarbonyl, carbamoyl or lower alkylcarbamoyl, $R^2$ is hydrogen, lower alkyl, or aryl, and $R^3$ is aryl, aroyl, lower alkanoyl or lower alkoxycarbonyl, in which each aryl group is phenyl, tolyl or anisyl.

The coupler radicals represented by A are well known in the art of disperse azo dyes as evidenced by the great number of U.S. and foreign patents disclosing such radicals. These known coupling components are attached to the azo group by a carbon atom which is a ring member of the benzene moiety of the coupler and which is in a para-position relative to the nitrogen atom of the coupler nucleus.

The coupling components represented by A are further illustrated by the formulas

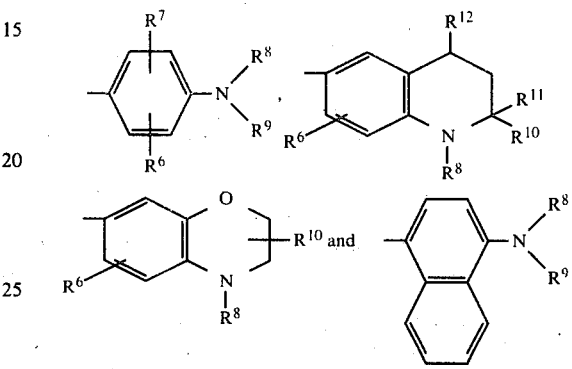

in which $R^6$ through $R^{10}$ can represent hydrogen or a wide variety of substituents. Examples of the substituents represented by $R^6$ and $R^7$ include halogen and unsubstituted and substituted alkyl, alkoxy, alkylthio, arylthio and acylamido radicals. Such acylamido groups include those having the formula $-NH-X-R^{13}$ in which X is $-CO-$, $-COO-$, or $-SO_2-$ and $R^{13}$ is unsubstituted or substituted alkyl, cycloalkyl, or aryl or when X is $-CO-$, $R^{13}$ also can be amino, alkylamino, dialkylamino, arylamino, or furyl. The alkyl groups represented by $R^{13}$ preferably are unsubstituted lower alkyl or lower alkyl substituted, for example, with halogen, aryl, cyano, lower alkylsulfonyl, hydroxy, lower alkylthio, lower alkanoyloxy, etc. As used herein to describe a substituent containing an alkyl moiety, "lower" designates a carbon content of one to about four carbon atoms. Cyclohexyl and lower alkylcyclohexyl are representative cycloalkyl groups represented by $R^{13}$. Methylamino, ethylamino, and butylamino are typical alkylamino groups which $R^{13}$ can represent. Typical aryl groups represented by $R^{13}$ and the aryl component of the arylamino groups represented by $R^{13}$ are described hereinbelow. Acetyl, propionyl, butyryl, cyanoacetyl, chloroacetyl, bromoacetyl, trifluoroacetyl, phenylacetyl, methoxyacetyl, ethylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, 2-chloroethylsulfonyl, cyclohexoyl, 4-ethylcyclohexoyl, benzoyl, 4-ethylbenzoyl, 4-cyanobenzoyl, 4-ethoxycarbonylbenzoyl, phenoxycarbonyl, 2,4-dichlorophenoxycarbonyl, 4-bromophenoxycarbonyl, 4-acetamidophenoxycarbonyl, benzenesulfonyl, p-toluenesulfonyl, 4-propionamidophenylsulfonyl, 4-chlorophenylsulfonyl, cyclohexoxycarbonyl, 4-butylcyclohexylsulfonyl, ethylcarbamoyl, butylsulfamoyl, phenylcarbamoyl, p-tolylcarbamoyl, p-anisylcarbamoyl, and phenylsulfamoyl are typical groups represented by $-X-R^{13}$.

The alkyl and alkoxy groups which can be present on the coupler ring preferably are unsubstituted lower alkyl and lower alkoxy such as methyl, ethyl, methoxy, ethoxy and butoxy. Phenoxy, p-tolyloxy, p-ethoxyphenoxy, methylthio, ethylthio, butylthio, phenylthio, m-acetamidophenylthio, and p-chlorophenylthio are typical aryloxy, alkylthio and arylthio groups which can be present on the coupler ring. When $R^6$ and $R^7$ both represent substituents on the aniline-coupler, it is generally preferred that they be in a para relationship with each other.

$R^8$ can represent unsubstituted or substituted alkyl of up to about eight or more carbon atoms, cycloalkyl such as the cycloalkyl groups represented by $R^{13}$, or aryl. The substituents which can be present on alkyl radical $R^8$ are limited primarily only by economic considerations and include hydroxy, lower alkoxy, halogen, cyano, succinimido, glutarimido, phthalimido, cyclohexyl, aryl, and groups having the formula —NH—X—$R^{13}$, —X—$R^{13}$, —OCO—$R^{13}$, —OCOO—$R^{13}$, —CONR$^4$R$^5$ and —SO$_2$NR$^4$R$^5$. Couplers containing such substituents are well known in the art and/or can be prepared by known means. Preferably, the substituted alkyl radicals represented by $R^8$ are substituted lower alkyl.

In addition to hydrogen, $R^9$ can represent one of the unsubstituted or substituted alkyl groups which $R^8$ can represent. $R^8$ and $R^9$ also can represent a single, combined group which, with the nitrogen atom to which each is attached, forms a ring. Examples of such combined groups include pentamethylene, ethyleneoxyethylene, and ethylenesulfonylethylene.

$R^{10}$, $R^{11}$ and $R^{12}$ can represent hydrogen or lower alkyl. In the tetrahydroquinoline coupling components, it is preferred that $R^{10}$ is methyl or, when $R^{11}$ and $R^{12}$ each is hydrogen, $R^{10}$ is lower alkyl, and $R^{11}$ and $R^{12}$ each is hydrogen or methyl.

Preferred coupling components represented by A are the aniline and tetrahydroquinoline radicals having the formulas

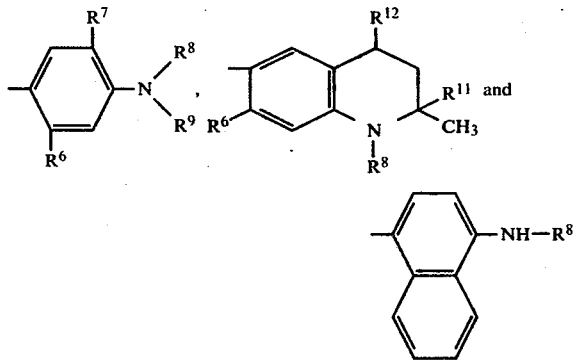

wherein $R^6$ is hydrogen, lower alkyl, lower alkoxy, halogen, lower alkanoylamino, lower alkoxycarbonylamino, or benzamido;

$R^7$ is hydrogen, lower alkoxy, or when $R^9$ is hydrogen, $R^7$ is lower alkyl;

$R^8$ individually is lower alkyl; lower alkyl substituted with hydroxy, lower alkoxy, cyano, carbamoyl, lower alkylcarbamoyl, lower dialkylcarbamoyl, lower alkanoylamino, lower alkoxycarbonylamino, lower alkanoyloxy, 2-pyrrolidinono, or lower alkoxycarbonyl; or cyclohexyl;

$R^9$ individually is hydrogen, lower alkyl, or lower alkyl substituted with hydroxy, lower alkoxy, lower alkanoyloxy, or lower alkoxycarbonyl;

$R^8$ and $R^9$ in combination are pentamethylene or ethyleneoxyethylene;

$R^{11}$ and $R^{12}$ are hydrogen or methyl.

The compounds of our invention which are especially valuable polyamide dyes because of their cost and performance, including shade, dyeability and fastness properties, on polyamide fibers are those designated below as Groups A, B and C.

Group A

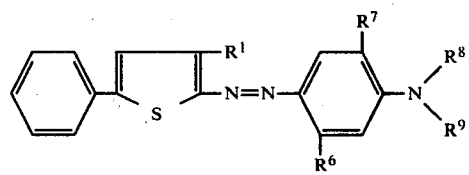

in which $R^1$ is lower alkoxycarbonyl, carbamoyl or lower alkylcarbamoyl, $R^6$ is hydrogen, methyl, lower alkanoylamino or lower alkoxycarbonylamino, $R^7$ is hydrogen or, when $R^9$ is hydrogen, $R^7$ is methyl, $R^8$ is lower alkyl, hydroxyethyl, hydroxypropyl, lower alkanoyloxyethyl, lower alkanoyloxypropyl, carbamoylethyl, lower alkylcarbamoylethyl, lower alkanoylaminoethyl, lower alkanoylaminopropyl, lower alkoxycarbonylaminoethyl or lower alkoxycarbonylaminopropyl, and $R^9$ is hydrogen, lower alkyl, hydroxyethyl, hydroxypropyl, lower alkanoyloxyethyl or lower alkanoyloxypropyl.

Group B

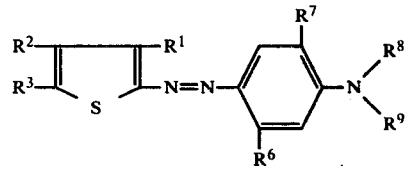

in which $R^1$ and $R^3$ each is lower alkoxycarbonyl, $R^2$ is hydrogen, methyl, or phenyl, and $R^6$ through $R^9$ are as defined in Group A.

Group C

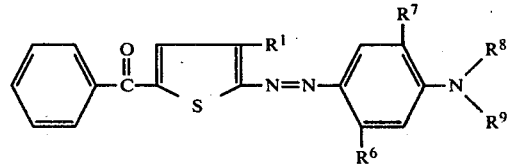

in which $R^1$ is lower alkoxycarbonyl, carbamoyl or lower alkylcarbamoyl and $R^6$ through $R^9$ are as defined in Group A.

Our novel compounds are synthesized by diazotizing an amine having the formula

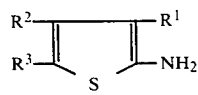

and coupling the resulting diazonium salt with a disperse dye coupler having the formula H—A. The amine diazo precursors are prepared according to procedures well documented in the literature: Z Chem., Volume 2, page 305 (1962); Chem, Ber., Volume 98, page 3571 (1965) and Volume 99, page 2712 (1966); and Chem. Heterocyclic Compds., Volume 2, page 285 (1966); and Volume 3, page 178 (1967). For example, an aldehyde or ketone having an unsubstituted or substituted α-methyl group can be condensed with an active cyanomethylene compound and elemental sulfur in the presence of a secondary amine. A second technique involves treating an activated vinyl compound bearing an unsubstituted or substituted β-methyl group with elemental sulfur in the presence of a secondary aliphatic amine. These reactions may be diagrammed as follows:

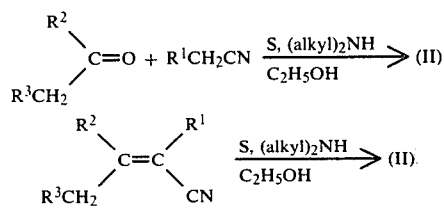

Amines obtained by the above procedures can be modified, for example, by bromination followed by nucleophilic displacement reactions.

The novel compounds of the invention, their use and their preparation are further illustrated by the following examples.

EXAMPLE 1

To an ice cold nitrosylsulfuric acid solution, prepared by adding 0.72 g. of $NaNO_2$ to 5.0 ml. of 96% $H_2SO_4$ below 80° C. followed by the addition of 10 ml. of 1:5 acid (1 part propionic acid and 5 parts acetic acid) below 20° C. is added slowly 2.18 g. of 2-amino-5-phenyl-3-thiophenecarboxamide. When the diazotization is complete, the diazonium solution is added with stirring to an ice cold solution of 2.63 g. of N-ethyl-N-2-acetamidoethyl-m-acetamidoaniline and 15 ml. of 1:5 acid. The coupling mixture is neutralized to Congo Red paper with the addition of ammonium acetate and is allowed to couple for 45 minutes. The azo product is precipitated by drowning in water and is collected by filtration, washed with water and air-dried. Recrystallization from 2-methoxyethanol gives an azo compound which dyes polyamide fibers blue-violet shades and displays good fastness properties.

The azo compounds described in the examples of Tables I, II, III and IV conform, respectively, to the general formula

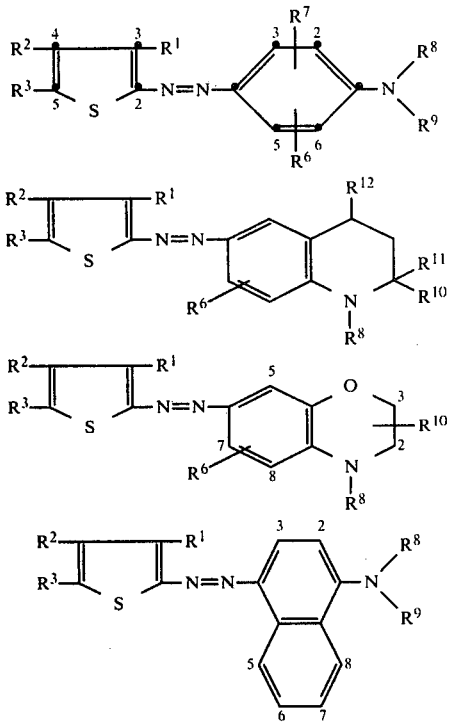

and are prepared according to the procedures described hereinabove. Example 1 of Table I designates the structure of the azo compound of preceding Example 1. The color given for each compound designates the shade produced by the compound on nylon fibers.

TABLE I

| Ex. No. | $R^1$, $R^2$, $R^3$ | $R^6$, $R^7$ | Color |
|---|---|---|---|
| 1 | 3-CONH$_2$-5-C$_6$H$_5$ | 3-NHCOCH$_3$ | Blue-Violet |
| 2 | 3-COOC$_2$H$_5$-4-CH$_3$5-COCH$_3$ | 3-CH$_3$ | Violet |
| 3 | 3-COOC$_2$H$_5$-5-CH$_3$ | H | Red |
| 4 | 3-COOC$_2$H$_5$-4-C$_6$H$_4$-p-OCH$_3$-5-Br | H | Violet |
| 5 | 3-COOC$_2$H$_5$-4-C$_6$H$_4$-p-Cl-5-Cl | H | Violet |
| 6 | 3-COOCH$_2$CH$_2$CH$_3$-4,5-di-CH$_3$ | H | Red |
| 7 | 3-COOCH$_2$CH$_2$CH$_3$-4-CH$_3$-5-C$_2$H$_5$ | H | Red |
| 8 | 3-COO(CH$_2$)$_3$CH$_3$-4,5-di-CH$_3$ | H | Red |
| 9 | 3-COO(CH$_2$)$_3$CH$_3$-4-CH$_3$-5-SCN | H | Red |
| 10 | 3-CN-5-N-N-C$_6$H$_5$ | H | Blue-Violet |
| 11 | 3-CN-4-C$_6$H$_5$-5-CH$_3$ | H | Red |
| 12 | 3-COOCH$_2$CH$_2$OH-4-C$_6$H$_5$-5-CH$_3$ | 3-CH$_3$ | Red |
| 13 | 3-COOCH$_3$-4-CH$_3$-5-COCH$_3$ | 3-CH$_3$ | Violet |
| 14 | 3-COOCH(CH$_3$)$_2$-4-CH$_3$-5-COCH$_3$ | 3-CH$_3$ | Violet |
| 15 | 3-COOC$_2$H$_5$-5-C$_6$H$_5$ | 3-NHCOCH$_3$ | Blue-Violet |
| 16 | 3-COOC$_2$H$_5$-5-C$_6$H$_5$ | 3-NHCOCH$_3$ | Blue-Violet |
| 17 | 3-CONH$_2$-5-C$_6$H$_5$ | 3-NHCOCH$_3$ | Blue |
| 18 | 3-CONH$_2$-5-C$_6$H$_5$ | 3-NHCOOCH$_3$ | Blue |
| 19 | 3-CONH$_2$-5-C$_6$H$_5$ | 3-NHCOCH$_2$OH | Blue-Violet |
| 20 | 3-CONHC$_2$H$_5$-5-C$_6$H$_5$ | 3-NHCOCH$_2$OOCCH$_3$ | Violet |

TABLE I-continued

| | | | |
|---|---|---|---|
| 21 | 3-CONHCH(CH₃)₂-5-C₆H₅ | 3-NHCOCH₂CN | Violet |
| 22 | 3-CONH(CH₂)₄CH₃-5-C₆H₅ | 3-NHCOCH₂CONH₂ | Blue-Violet |
| 23 | 3-CON(C₂H₅)-5-C₆H₅ | 3-NHCOC₆H₅ | Violet |
| 24 | 3-CONHCH₂C₆H₅-5-C₆H₅ | 3-NHCOC₆H₁₁ | Blue-Violet |
| 25 | 3-CONH₂-5-C₆H₄-p-OCH₃ | 3-NHCOC₂H₅ | Blue-Violet |
| 26 | 3-CONH₂-5-C₆H₄-p-CH₃ | 2,5-di-Cl | Red-Violet |
| 27 | 3-CONH₂-5-C₆H₄-m-Cl | 2-CH₃-5-OCH₃ | Violet |
| 28 | 3-CONH₂-5-C₆H₄-p-CN | 2-OCH₃-5-NHCOCH₃ | Blue |
| 29 | 3-CONH₂-5-CH₃ | 2-CH₃ | Red-Orange |
| 30 | 3-CONH₂-4,5-di-CH₃ | 2-Cl | Orange |
| 31 | 3-CONH₂-4-C₆H₅-5-CH₃ | 2-OCH₃ | Red |
| 32 | 3-CN-4-CH₃-5-C₆H₅ | 3-OCH₃ | Violet |
| 33 | 3-COOC₂H₅-4-CH₃-5-C₆H₅ | 3-Cl | Violet |
| 34 | 3-COOC₂H₅-4-CH₃-5-CONHC₆H₄-o-OCH₃ | 2,5-di-OCH₃ | Blue-Violet |
| 35 | 3-COOC₂H₅-4-CH₃-5-CONHC₆H₄-p-Cl | 2,5-di-OCH₃ | Blue-Violet |
| 36 | 3-COOC₂H₅-4-CH₃-5-CONHC₆H₄-p-CH₃ | 2,5-di-OCH₃ | Blue-Violet |
| 37 | 3-COOC₂H₅-5-COCH₃ | 2,5-di-OCH₃ | Blue-Violet |
| 38 | 3-COOC₂H₅-COCH₃ | 3-NHCOCH₃ | Blue-Violet |
| 39 | 3-COOC₂H₅-5-COCH₃ | 3-NHCOCH₃ | Blue-Violet |
| 40 | 3-COOC₂H₅-5-COCH₃ | 3-NHCOCH₃ | Violet |
| 41 | 3-COOC₂H₅-5-COCH₃ | 3-NHCOCH₃ | Violet |
| 42 | 3,5-di-CN-4-CH₃ | 2-CH₃-5-NHCOCH₃ | Blue-Violet |
| 43 | 3,5-di-CN-4-CH₃ | 2-CH₃-5-NHCOCH₃ | Blue |
| 44 | 3-CN-4-CH₃-5-CONHC₆H₅ | 2-CH₃-5-NHCOCH₃ | Blue |
| 45 | 3-COOCH₃-4-CH₃-5-SCN | 2-CH₃-5-NHCOOC₂H₅ | Violet |
| 46 | 3-COOCH₃-4-CH₃-5-CONHC₆H₁₁ | 2-OCH₃-5-NHCOCH₃ | Blue |
| 47 | 3-COOCH₃-4-CH₃-5-CON(CH₂)₄CH₂ | | |
| 48 | 3,5-di-CN-4-C₆H₅ | 2-OCH₃-5-NHCOCH₃ | Blue-Violet |
| 49 | 3,5-di-COOC₂H₅-4-CH₃ | 3-NHCOCH₃ | Violet |
| 50 | 3,5-di-COOC₂H₅-4-CH₃ | 3-CH₃ | Red |
| 51 | 3,5-di-COOC₂H₅-4-CH₃ | H | Red |
| 52 | 3,5-di-COOC₂H₅-4-CH₃ | 3-CH₃ | Violet |
| 53 | 3,5-di-COOC₂H₅-4-CH₃ | 3-NHCOCH₃ | Violet |
| 54 | 3-COOC₂H₅-5-COC₆H₅ | 3-NHCOCH₃ | Blue |
| 55 | 3-COOC₂H₅-5-COC₆H₅ | 3-CH₃ | Blue-Violet |
| 56 | 3-CONH₂-5-C₆H₅ | 3-CH₃ | Blue-Violet |
| 57 | 3-COHN₂-5-C₆H₅ | 3-NHCOCH₃ | Blue-Violet |
| 58 | 3-CONH₂-5-C₆H₅ | H | Violet |
| 59 | 3-CONHCH(CH₃)₂-5-C₆H₅ | 3-CH₃ | Blue-Violet |
| 60 | 3-CONHCH(CH₃)₂-5-C₆H₅ | 3-NHCOCH₃ | Blue |
| 61 | 3-CONHCH(CH₃)₂-5-C₆H₅ | H | Violet |
| 62 | 3-CONH(CH₂)₃CH₃-5-C₆H₅ | 3-CH₃ | Blue-Violet |
| 63 | 3-CONH(CH₂)₃CH₃-5-C₆H₅ | 3-CH₃ | Blue-Violet |
| 64 | 3-CONH(CH₂)₃CH₃-5-C₆H₅ | 3-NHCOCH₃ | Blue |
| 65 | 3-CONHC₆H₅-5-C₆H₅ | 3-CH₃ | Blue-Violet |
| 66 | 3-CONHC₆H₅-5-C₆H₅ | 3-CH₃ | Blue-Violet |

TABLE II

| Ex. No. | R¹, R², R³ | R⁶, R¹⁰, R¹¹, R¹² | R⁸ | Color |
|---|---|---|---|---|
| 67 | 3-CN-4-CH₃-5-Br | 2,2,4-tri-CH₃ | —CH₂CH₂CONH₂ | Violet |
| 68 | 3-COOC₂H₅-5-COC₆H₅ | 2,2,4-tri-CH₃ | —CH₂CH₂NHCOCH₂ | Blue |
| 69 | 3-CONH₂-4-CH₃-5-SCN | 2,2,4-tri-CH₃ | —CH₂CH₂OH | Blue-Violet |
| 70 | 3-COOC₂H₅-4-CH₃-5-COC₂H₅ | 2,2,4-tri-CH₃ | —CH₂CH₂CN | Blue-Violet |
| 71 | 3-COOCH₃-5-C₆H₅ | 2-CH₃-7-NHCOCH₃ | —C₂H₅ | Blue |
| 72 | 3-CONH₂-5-C₆H₅ | 2,2,4-tri-CH₃-7-NHCOCH₃ | —CH₂CH₂CONH₂ | Blue |
| 73 | 3-CONH₂-5-C₆H₅ | 2,2,4,7-tetra-CH₃ | —C₂H₅ | Blue |
| 74 | 3-CONH₂-5-C₆H₅ | 2,2,4,7-tetra-CH₃ | —CH₂CH₂Cl | Blue-Violet |
| 75 | 3-CONH₂-5-C₆H₅ | 2,2,4,7-tetra-CH₃ | —CH₂CH₂OOCC₂H₅ | Blue-Violet |
| 76 | 3-CONH₂-5-C₆H₅ | 2,2,4,7-tetra-CH₃ | —CH₂CH₂OC₂H₅ | Blue |
| 77 | 3-CONH₂-5-C₆H₅ | 2,7-di-CH₃ | —CH₂CH₂CONH₂ | Blue-Violet |
| 78 | 3-COOC₂H₅-5-C₆H₅ | 2,2,4,7-tetra-CH₃ | —CH₂CH₂CONHC₂H₅ | Blue |
| 79 | 3-COOC₂H₅-5-C₆H₅ | 2,2,4,7-tetra-CH₃ | —CH₂CH₂CONH(CH₂)₃CH₃ | Blue |
| 80 | 3-COOC₂H₅-5-C₆H₅ | 2,2,4,7-tetra-CH₃ | —CH₂CH₂CON(C₂H₅)₂ | Blue |
| 81 | 3-CONH₂-5-C₆H₅ | 2,2,4,7-tetra-CH₃ | —CH₂CH₂CONHCH₂C₆H₅ | Blue |
| 82 | 3-CONH₂-5-C₆H₅ | 2,2,4,7-tetra-CH₃ | —CH₂CH₂OOCOC₂H₅ | Blue |
| 83 | 3-CONHCH(CH₃)₂-5-C₆H₅ | 2,2,4,7-tetra-CH₃ | —CH₂CH₂CONH₂ | Blue |
| 84 | 3-CONHCH(CH₃)₂-5-C₆H₅ | 2,2,4,7-tetra-CH₃ | —CH₂CH₂NCOCH₂CO | Blue |
| 85 | 3-COOC₂H₅-4-CH₃-5-COCH₃ | 2-CH(CH₃)₂-7-NHCOCH₃ | —C₂H₅ | Blue |
| 86 | 3-COOC₂H₅-4-CH₃-5-COCH₃ | 7-CH₃ | —CH₂CH₂NHCOCH₃ | Blue-Violet |
| 87 | 3-COOC₂H₅-4-CH₃-5-COCH₃ | 2,7-di-CH₃ | —CH₂CH₂CONH₂ | Blue-Violet |
| 88 | 3-COOC₂H₅-5-COCH₃ | 2-CH₃ | —CH₂CH₂Br | Blue-Violet |
| 89 | 3-CONH₂-5-COCH₃ | H | —CH₂CH₂NHCOCH₂OH | Violet |
| 90 | 3-CONH₂-4-CH₃-COCH₃ | H | —CH₂CH₂COCH=CH₂ | Violet |
| 91 | 3,5-di-COOC₂H₅-4-CH₃ | 2,2,4,7-tetra-CH₃ | —C₂H₅ | Violet |
| 92 | 3,5-di-COOC₂H₅-4-CH₃ | 2,2,4,7-tetra-CH₃ | —CH₂CH₂NHCOCH₃ | Violet |

TABLE II-continued

| Ex. No. | $R^1, R^2, R^3$ | $R^6, R^{10}, R^{11}, R^{12}$ | $R^8$ | Color |
|---|---|---|---|---|
| 93 | 3,5-di-$COOC_2H_5$-4-$CH_3$ | 2,2,4,7-tetra-$CH_3$ | —$CH_2CH_2OH$ | Violet |
| 94 | 3,5-di-$COOC_2H_5$-4-$CH_3$ | 2,2,4,7-tetra-$CH_3$ | —$CH_2CH_2OOCCH_3$ | Violet |
| 95 | 3,5-di-$COOC_2H_5$-4-$CH_3$ | 2,2,4-tri-$CH_3$-7-$NHCOCH_3$ | —$C_2H_5$ | Blue-Violet |
| 96 | 3,5-di-$COOC_2H_5$-4-$CH_3$ | 2,2,4-tri-$CH_3$-7-$NHCOCH_3$ | —$CH_2CH_2CONH_2$ | Blue-Violet |
| 97 | 3,5-di-$COOC_2H_5$-4-$CH_3$ | 2,2,4-tri-$CH_3$-7-$NHCOCH_3$ | —$CH_2CH_2OH$ | Blue-Violet |
| 98 | 3,5-di-$COOC_2H_5$-4-$CH_3$ | 2,2,4-tri-$CH_3$-7-$NHCOCH_3$ | —$CH_2C_6H_5$ | Blue-Violet |

TABLE III

| Ex. No. | $R_1, R^2, R^3$ | $R^6, R^{10}$ | $R^8$ | Color |
|---|---|---|---|---|
| 99 | 3-$COOC_2H_5$-4-$C_6H_5$-5-Br | 2,7-di-$CH_3$ | —$C_2H_5$ | Violet |
| 100 | 3-$COOC_2H_5$-4-$C_6H_4$-p-$OCH_3$-5-SCN | 2,7-di-$CH_3$ | —$C_2H_5$ | Violet |
| 101 | 3,5-di-$COOC_2H_5$-4-$CH_3$ | 2,7-di-$CH_3$ | —$CH_2CH_2CH_2NHCOCH_3$ | Violet |
| 102 | 3,5-di-$COOC_2H_5$-4-$CH_3$ | 2,7-di-$CH_3$ | —$CH_2CH_2OH$ | Violet |
| 103 | 3-$COOC_2H_5$-4-$CH_3$-5-$COCH_3$ | 2,7-di-$CH_3$ | —$C_2H_5$ | Blue-Violet |
| 104 | 3,5-di-$COOC_2H_5$-4-$CH_3$ | 2,7-di-$CH_3$ | —$CH_2CH_2COOCH_2C_6H_5$ | Violet |
| 105 | 3-CN-4-$CH_3$-5-$CONHC_6H_4$-p-$OCH_3$ | 2,7-di-$CH_3$ | —$C_2H_5$ | Violet |
| 106 | 3-CN-4-$CH_3$-5-$CONHC_6H_5$ | 2,7-di-$CH_3$ | —$C_2H_5$ | Violet |
| 107 | 3-$CONH_2$-5-$C_6H_5$ | 2-$CH_3$ | —$C_2H_5$ | Violet |
| 108 | 3-$CONH_2$-4-$CH_3$-5-$C_6H_5$ | 2-$CH_3$ | —$C_2H_5$ | Violet |
| 109 | 3-$CONH_2$-5-$C_6H_5$ | 2-$CH_3$ | —$CH_2CH(OH)CH_2OH$ | Violet |
| 110 | 3-$CONH_2$-5-$CH_3$ | 2-$CH_3$ | —$CH_2CH_2Cl$ | Red |
| 111 | 3-$CONH_2$-4,5-di-$CH_3$ | 2-$CH_3$ | —$CH_2CH_2CN$ | Red |
| 112 | 3-$CONH_2$-4,5-di-$C_6H_5$ | 2-$CH_3$ | —$CH_2CH_2CONH_2$ | Red |
| 113 | 3-$CONH_2$-4-$CH_3$-5-$COCH_3$ | 2-$CH_3$ | —$CH_2CH_2NHCOCH_3$ | Violet |
| 114 | 3-$CONHCH_2CH_3$-4-$CH_3$-5-$C_6H_5$ | 2-$CH_3$ | —$(CH_2)_3NHCOCH_3$ | Violet |
| 115 | 3-$CONHCH_2CH_3$-4-$CH_3$-5-$C_6H_5$ | 2-$CH_3$ | —$CH_2CH_2NHCOCNH_2$ | Violet |
| 116 | 3-$CONH(CH_2)_3CH_3$-5-$C_6H_5$ | 2,7-di-$CH_3$ | —$C_2H_5$ | Blue |
| 117 | 3-$CONH(CH_2)_3CH_3$-4-$C_6H_5$-5-$CH_3$ | 2-$CH_3$-7-$NHCOCH_3$ | —$CH_2CH_2NHCOCH=CH_2$ | Blue-Violet |
| 118 | 3-$CON(C_2H_5)_2$-4-$CH_3$-5-$C_6H_5$ | 2-$CH_3$-7-$NHCOCH_3$ | —$CH_2CH_2NHCON(CH_3)_2$ | Violet |
| 119 | 3-$CON(C_2H_5)_2$-4-$CH_3$-5-$CONHC_6H_4$-p-$CH_3$ | 2-$CH_3$-7-$NHCOCH_3$ | —$CH_2CH_2NHCOOC_2H_5$ | Violet |
| 120 | 3-$COOCH(CH_3)_2$-4-$CH_3$-5-$C_6H_5$ | 2-$CH_3$-7-$NHCOCH_3$ | —$CH_2CH_2NHSO_2CH_3$ | Blue-Violet |

TABLE IV

| Ex. No. | $R^1, R^2, R^3$ | Naphthalene Substituents | $R^8$ | $R^9$ | Color |
|---|---|---|---|---|---|
| 121 | 3-$CONH_2$-5-$C_6H_5$ | H | —$C_6H_5$ | H | Blue |
| 122 | 3-$COOC_2H_5$-5-$C_6H_5$ | H | —$C_6H_5$ | H | Blue-Violet |
| 123 | 3-$COOC_2H_5$-5-$C_6H_5$ | 5-OH | —$C_6H_5$ | H | Blue |
| 124 | 3-$CONH_2$-5-$C_6H_5$ | H | —$C_6H_{11}$ | H | Blue |
| 125 | 3-$CONH_2$-4-$CH_3$-5-$C_6H_5$ | H | —$C_2H_5$ | H | Blue-Violet |
| 126 | 3-$COOC_2H_5$-4-$CH_3$-5-$C_6H_5$ | 2-$OCH_3$ | —$CH_2CH_2NHCOCH_3$ | H | Blue |
| 127 | 3-$COOC_2H_5$-4,5-di-$CH_3$ | H | —$CH_2CH_2COOC_2H_5$ | H | Violet |
| 128 | 3-$CONH_2$-5-$CH_3$ | H | —$C_6H_{11}$ | H | Violet |
| 129 | 3-CN-5-$CH_3$ | H | —$C_2H_5$ | —$C_2H_5$ | Red |
| 130 | 3-CN-4-$CH_3$-5-SCN | H | —$CH_2CH_2OH$ | —$CH_2CH_2CN$ | Violet |
| 131 | 3,5-di-$COOC_2H_5$-4-$CH_3$ | 5-OH | —$CH_2CH_2OOCCH_3$ | —$CH_2CH_2CN$ | Violet |
| 132 | 3,5-di-$COOC_2H_5$-4-$CH_3$ | 5-OH | —$CH_2C_6H_{11}$ | H | Blue-Violet |
| 133 | 3,5-di-$COOC_2H_5$-4-$CH_3$ | 2-$OCH_3$ | —$CH_2C_6H_{11}$ | H | Blue-Violet |
| 134 | 3-$CONH_2$-4-$CH_3$-5-Br | 5-OH | —$CH_2C_6H_{11}$ | H | Blue-Violet |
| 135 | 3,5-di-CN-4-$CH_3$ | H | —$CH_2C_6H_{11}$ | —$CH_2C_6H_{11}$ | Blue-Violet |
| 136 | 3-$COOCH_3$-4-$CH_3$-5-$COCH_3$ | H | —$CH_2CH_2OH$ | —$CH_2CH_2OH$ | Blue-Violet |
| 137 | 3-$COOCH_3$-5-$COCH_3$ | H | —$CH_2CH_2OH$ | —$CH_2CH_2CONH_2$ | Blue-Violet |
| 138 | 3-$COOC_2H_5$-5-$COCH_3$ | H | —$CH_2CH(OH)CH_2OH$ | H | Blue |
| 139 | 3-$COOC_2H_5$-4-$CH_3$-5-$CONHC_6H_4$-p-$CH_3$ | H | —$CH_2CH_2SO_2CH=CH_2$ | H | Violet |
| 140 | 3-$COOC_2H_5$-4-$CH_3$-5-$CONHC_6H_4$-p-Cl | H | —$CH_2CH_2SO_2CH=CH_2$ | H | Violet |
| 141 | 3,5-di-CN-4-$C_6H_5$ | H | —$CH_2CH_2SO_2CH=CH_2$ | H | Blue-Violet |
| 142 | 3-$CONH_2$-4-$C_6H_5$-5-$COOC_2H_5$ | H | —$CH_2CH_2SO_2CH=CH_2$ | H | Blue-Violet |
| 143 | 3-CN-4-$C_6H_5$-5-Br | H | —$CH_2CH_2SO_2CH=CH_2$ | H | Violet |
| 144 | 3-$CONH_2$-5-$C_6H_5$ | H | —$C_2H_5$ | H | Blue |
| 145 | 3-$CONH_2$-5-$C_6H_5$ | H | —$CH_2CH_2CONH_2$ | H | Blue |
| 146 | 3-$CONH_2$-5-$C_6H_5$ | H | —$CH_2CH_2NHCOCH_3$ | H | Blue |
| 147 | 3-$CONH_2$-5-$C_6H_5$ | H | —$(CH_2)_3NHCOCH_3$ | H | Blue |
| 148 | 3-$CONH_2$-5-$C_6H_5$ | H | —$CH_2CH_2NCH_2CH_2CH_2CO$ (cyclic) | H | Blue |
| 149 | 3-$CONHCH(CH_3)_2$-5-$C_6H_5$ | H | —$CH_2CH_2OH$ | H | Blue |
| 150 | 3-$CONHCH(CH_3)_2$-5-$C_6H_5$ | H | —$(CH_2)_3OH$ | H | Blue |
| 151 | 3-$CONHCH(CH_3)_2$-5-$C_6H_5$ | H | —$CH_2CH_2NHCOOC_2H_5$ | H | Blue |
| 152 | 3-$CONHCH(CH_3)_2$-5-$C_6H_5$ | H | —$CH_2C_6H_{11}$ | H | Blue |
| 153 | 3-$CONHCH(CH_3)_2$-5-$C_6H_5$ | H | —$CH_2C_6H_{10}$-p-$CH_2OH$ | H | Blue |
| 154 | 3-$COOC_2H_5$-5-$C_6H_5$ | H | —$CH(CH_3)C_2H_5$ | H | Blue |
| 155 | 3-$COOC_2H_5$-5-$C_6H_5$ | H | —$CH_2CH(OH)CH_2Cl$ | H | Blue |
| 156 | 3-$COOC_2H_5$-5-$C_6H_5$ | H | —$CH_2CH(OH)CH_2OCH(CH_3)_2$ | H | Blue |
| 157 | 3-$COOC_2H_5$-5-$C_6H_5$ | H | —$CH_2CH_2OCH_2CH_2OH$ | H | Blue |

TABLE IV-continued

| Ex. No. | $R^1$, $R^2$, $R^3$ | Naphthalene Substituents | $R^8$ | $R^9$ | Color |
|---|---|---|---|---|---|
| 158 | 3-COOC$_2$H$_5$-5-C$_6$H$_5$ | H | —CH$_2$CH$_2$CN | H | Blue |
| 159 | 3-COOC$_2$H$_5$-5-COC$_6$H$_5$ | H | —CH$_2$CH$_2$CONHCH(CH$_3$)$_2$ | H | Blue |
| 160 | 3-COOC$_2$H$_5$-5-COC$_6$H$_5$ | H | —CH$_2$CH$_2$COOC$_2$H$_5$ | H | Blue |
| 161 | 3-COOC$_2$H$_5$-5-COC$_6$H$_5$ | H | —CH$_2$CH$_2$OCH$_2$CH$_2$OCH$_3$ | H | Blue |
| 162 | 3-COOC$_2$H$_5$-5-COC$_6$H$_5$ | H | —(CH$_2$)$_6$NHCOCH$_3$ | H | Blue |
| 163 | 3-CONHC$_2$H$_5$-5-COC$_6$H$_5$ | H | —CH$_2$CH$_2$C$_6$H$_5$ | H | Blue |
| 164 | 3-CONHC$_2$H$_5$-5-COC$_6$H$_5$ | H | —CH$_2$C$_6$H$_4$-p-OCH$_3$ | H | Blue |
| 165 | 3-CONHC$_2$H$_5$-5-COC$_6$H$_5$ | H | —CH$_2$CH═CH$_2$ | H | Blue |

The novel azo compounds can be applied to synthetic polyamide polyester and cellulose acetate fibers according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 166

The azo compound (16.7 mg.) of Example 1 is dispersed in 10 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. The fabric is dyed a bright shade of blue-violet exhibiting excellent fastness properties when tested in accordance with the procedures described in the Technical Manual of the American Association of Textile Chemists and Colorists, 1968 edition.

The synthetic polyamide fibers which can be dyed with the novel azo compounds are well known and have a basis of a linear polyamide such as nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright, fast shades by the compounds of the invention is set forth in U.S. Pat. No. 3,100,134.

The invention has been described in considerable detail with particular reference to certain preferred embodiments thereof, but it will be understood that variations and modifications can be effected within the spirit and scope of the invention.

We claim:

1. A compound having the formula

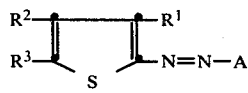

wherein $R^1$ is cyano; lower alkanoyl; benzoyl and benzoyl substituted with lower alkyl or lower alkoxy of 1–6 carbons, chlorine and bromine; lower alkoxycarbonyl; lower hydroxyalkoxycarbonyl; lower alkoxy-lower-alkoxycarbonyl; or the group —CONR$^4$R$^5$ in which R$^4$ individually is hydrogen, lower alkyl, cyclohexyl, lower alkylcyclohexyl, cyclohexylmethylene, lower alkylcyclohexylmethylene, lower hydroxyalkylcyclohexylmethylene, or phenyl-lower-alkylene; R$^5$ individually is hydrogen or lower alkyl; and R$^4$ and R$^5$ in combination are pentamethylene;

R$^2$ is hydrogen, lower alkyl, lower alkoxy, aryl-lower-alkylene or aryl;

R$^3$ is aryl or a group which R$^1$ can represent;

A is a disperse azo dye coupling component selected from an aniline having the formula

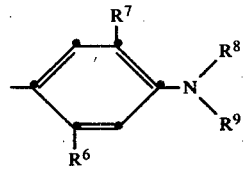

wherein

R$^6$ is hydrogen, lower alkyl, lower alkoxy, chlorine, bromine, lower alkanoylamino, lower alkoxycarbonylamino, or

R$^7$ is hydrogen, lower alkoxy, or when R$^9$ is hydrogen, R$^7$ is lower alkyl;

R$^8$ individually is lower alkyl; lower alkyl substituted with hydroxy, lower alkoxy, cyano, carbamoyl, lower alkylcarbamoyl, lower dialkylcarbamoyl, lower alkanoylamino, lower alkoxycarbonylamino, lower alkanoyloxy, or lower alkoxycarbonyl; or cyclohexyl;

R$^9$ individually is hydrogen; lower alkyl; or lower alkyl substituted with hydroxy, lower alkoxy, lower alkanoyloxy or lower alkoxycarbonyl; and R$^8$ and R$^9$ in combination are pentamethylene or ethyleneoxyethylene;

a 1,2,3,4-tetrahydroquinoline having the formula

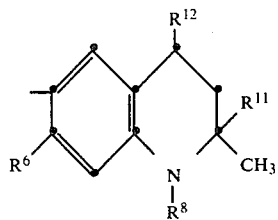

wherein
R⁶ is as defined above;
R⁸ is as defined above; and
R¹¹ and R¹² are hydrogen or methyl;
a benzomorpholine having the formula

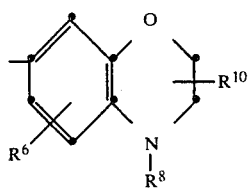

in which R⁶ and R⁸ are as defined above and R¹⁰ is hydrogen or lower alkyl; or
an α-naphthylamine having the formula

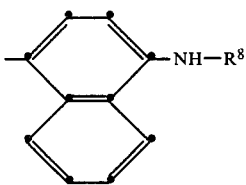

wherein
R⁸ is as defined above;
in which each aryl moiety is phenyl or phenyl substituted with lower alkyl, lower alkoxy, chlorine, bromine, lower alkanoylamino, cyano or lower alkoxycarbonyl.

2. A compound according to claim 1 having the formula

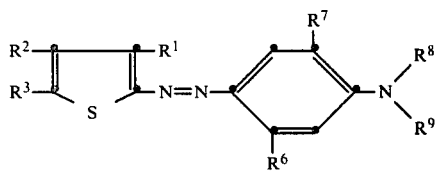

wherein
R¹ is lower alkoxycarbonyl, carbamoyl, or lower alkylcarbamoyl;
R² is hydrogen, lower alkyl or aryl;
R³ is aryl, lower alkanoyl, benzoyl and benzoyl substituted with lower alkyl or lower alkoxy of 1-6 carbons, chlorine and bromine, or lower alkoxycarbonyl;
R⁶ is hydrogen, lower alkyl, lower alkoxy, chlorine, bromine, lower alkanoylamino, lower alkoxycarbonylamino, or

R⁷ is hydrogen, lower alkoxy, or when R⁹ is hydrogen, R⁷ is lower alkyl;
R⁸ individually is lower alkyl; lower alkyl substituted with hydroxy, lower alkoxy, cyano, carbamoyl, lower alkylcarbamoyl, lower dialkylcarbamoyl, lower alkanoylamino, lower alkoxycarbonylamino, lower alkanoyloxy, or lower alkoxycarbonyl; or cyclohexyl;
R⁹ individually is hydrogen, lower alkyl, or lower alkyl substituted with hydroxy, lower alkoxy, lower alkanoyloxy or lower alkoxycarbonyl; and
R⁸ and R⁹ in combination are pentamethylene or ethyleneoxyethylene.

3. A compound according to claim 1 having the formula

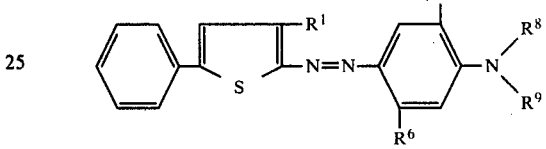

wherein
R¹ is lower alkoxycarbonyl, carbamoyl or lower alkylcarbamoyl;
R⁶ is hydrogen, methyl, lower alkanoylamino or lower alkoxycarbonylamino;
R⁷ is hydrogen or, when R⁹ is hydrogen, R⁷ is methyl;
R⁸ is lower alkyl, hydroxyethyl, hydroxypropyl, lower alkanoyloxyethyl, lower alkanoyloxypropyl, carbamoylethyl, lower alkylcarbamoylethyl, lower alkanoylaminoethyl, lower alkanoylaminopropyl, lower alkoxycarbonylaminoethyl or lower alkoxycarbonylaminopropyl; and
R⁹ is hydrogen, lower alkyl, hydroxyethyl, hydroxypropyl, lower alkanoyloxyethyl or lower alkanoyloxypropyl.

4. A compound according to claim 1 having the formula

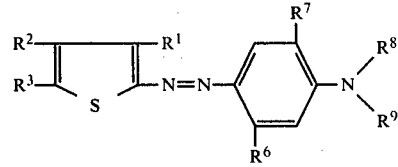

wherein
R¹ and R³ each is lower alkoxycarbonyl;
R² is hydrogen, methyl or aryl;
R⁶ is hydrogen, methyl, lower alkanoylamino or lower alkoxycarbonylamino;
R⁷ is hydrogen, or, when R⁹ is hydrogen, R⁷ is methyl;
R⁸ is lower alkyl, hydroxyethyl, hydroxypropyl, lower alkanoyloxyethyl, lower alkanoyloxypropyl, carbamoylethyl, lower alkylcarbamoylethyl, lower alkanoylaminoethyl, lower alkanoylaminopropyl, lower alkoxycarbonylaminoethyl or lower alkoxycarbonylaminopropyl; and $R^9$ is hydrogen, lower alkyl, hydroxyethyl, hydroxypropyl, lower alkanoyloxyethyl or lower alkanoyloxypropyl.

5. A compound according to claim 1 having the formula

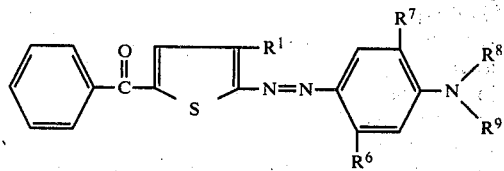

wherein $R^1$ is lower alkoxycarbonyl, carbamoyl or lower alkylcarbamoyl;

$R^6$ is hydrogen, methyl, lower alkanoylamino or lower alkoxycarbonylamino;

$R^7$ is hydrogen or, when $R^9$ is hydrogen, $R^7$ is methyl;

$R^8$ is lower alkyl, hydroxyethyl, hydroxypropyl, lower alkanoyloxyethyl, lower alkanoyloxypropyl, carbamoylethyl, lower alkylcarbamoylethyl, lower alkanoylaminoethyl, lower alkanoylaminopropyl, lower alkoxycarbonylaminoethyl or lower alkoxycarbonylaminopropyl; and $R^9$ is hydrogen, lower alkyl, hydroxyethyl, hydroxypropyl, lower alkanoyloxyethyl or lower alkanoyloxypropyl.

6. A compound of the formula

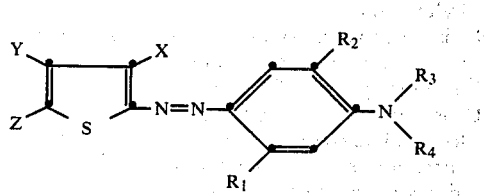

wherein

X is —CN; —COR; —CO-phenyl or —CO-phenyl substituted by —R, —OR, Cl or Br; —COO-R—OH; —COOR; —COOR—OR; or —CONR₅R₆ in which R₅ is individually H, —R, —C₆H₁₁—R, —R—C₆H₁₁, —C₆H₁₁, —R—C₆H₁₁—R, —R—C₆H₁₁—R—OH or —R-phenyl;

R₆ is individually H or —R; and, R₅ and R₆ in combination are pentamethylene;

Y is H, —R; —OR; phenyl or phenyl substituted by —R, —OR, Cl, Br, —NHCOR, —CN or —COOR; —R-phenyl or —R-phenyl substituted by —R, —OR, Cl, Br, —CN, —NHCOR or —COOR;

Z is X, phenyl or phenyl substituted by —R, —OR, Cl, Br, —NHCOR, —CN or —COOR;

R₁ is H, —R, —OR, Cl, Br, —NHCOR, —NHCOOR or —NHCO-phenyl;

R₂ is H; —OR; or when R₄ is H, R₂ is —R;

R₃ is —R, —R—OH, —R—OR, —R—CN, —R—CONH₂, —R—CONHR, —R—CON(R)₂, —R—NHCOR, —R—NHCOOR, —R—OCOR, —RCOOR or —R—C₆H₁₁;

R₄ is H, —R, —R—OH, —R—OR, —R—OCOR or —R—COOR; and

R is alkyl or alkylene as the case may be.

7. A compound according to claim 1 having the formula

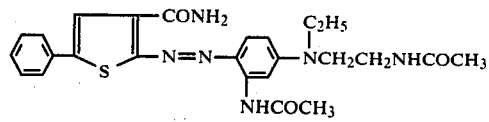

8. A compound according to claim 1 having the formula

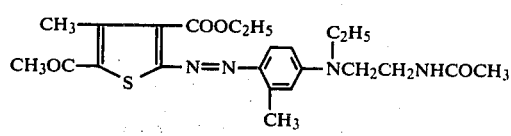

9. A compound according to claim 1 having the formula

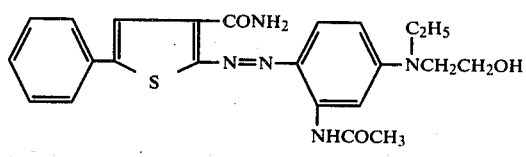

10. A compound according to claim 1 having the formula

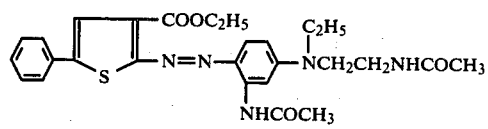

11. A compound according to claim 1 having the formula

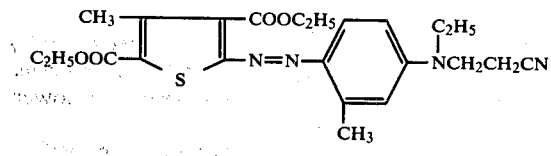

12. A compound according to claim 1 having the formula

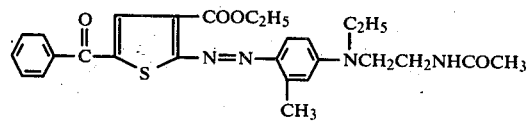

13. A compound according to claim 1 having the formula

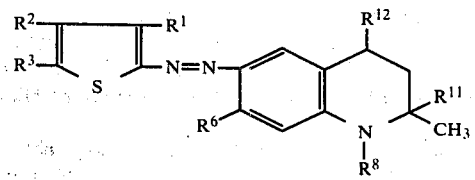

wherein $R^1$ is lower alkoxycarbonyl, carbamoyl, or lower alkylcarbamoyl;

$R^2$ is hydrogen, lower alkyl or aryl;

$R^3$ is aryl, lower alkanoyl, aroyl, or lower alkoxycarbonyl;

$R^6$ is hydrogen, lower alkyl, lower alkoxy, chlorine, bromine, lower alkanoylamino, lower alkoxycarbonylamino, or

$R^8$ is lower alkyl; lower alkyl substituted with hydroxy, lower alkoxy, cyano, carbamoyl, lower alkylcarbamoyl, lower dialkylcarbamoyl, lower alkanoylamino, lower alkoxycarbonylamino, lower alkanoyloxy, or lower alkoxycarbonyl; or cyclohexyl; and $R^{11}$ and $R^{12}$ are hydrogen or methyl.

14. A compound according to claim 13 wherein $R^6$ is hydrogen, methyl, lower alkanoylamino or lower alkoxycarbonylamino; and $R^8$ is lower alkyl, hydroxyethyl, hydroxypropyl, lower alkanoyloxyethyl, lower alkanoyloxypropyl, carbamoylethyl, lower alkylcarbamoylethyl, lower alkanoylaminoethyl, lower alkanoylaminopropyl, lower alkoxycarbonylaminoethyl or lower alkoxycarbonylaminopropyl.

15. A compound according to claim 1 having the formula

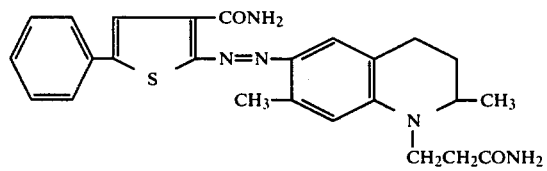

16. A compound according to claim 1 having the formula

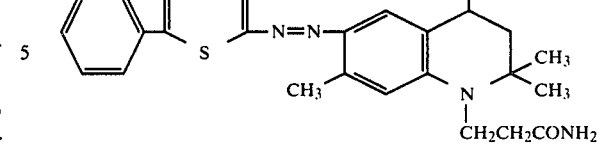

17. A compound according to claim 1 having the formula

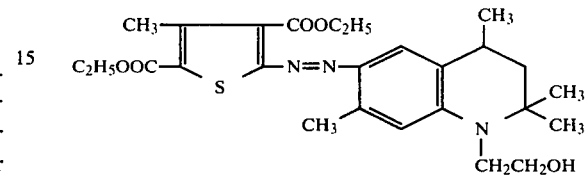

18. A compound according to claim 1 having the formula

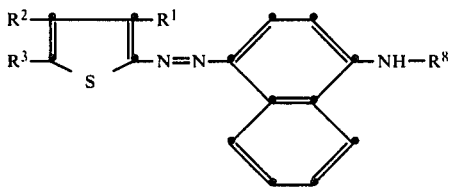

wherein $R^1$ is lower alkoxycarbonyl, carbamoyl, or lower alkylcarbamoyl;

$R^2$ is hydrogen, lower alkyl, or aryl;

$R^3$ is aryl; lower alkanoyl; benzoyl and benzoyl substituted with lower alkyl or lower alkoxy of 1–6 carbons, chlorine and bromine; or lower alkoxycarbonyl; and $R^8$ is lower alkyl; lower alkyl substituted with hydroxy, lower alkoxy, cyano, carbamoyl, lower alkylcarbamoyl, lower dialkylcarbamoyl, lower alkanoylamino, lower alkoxycarbonylamino, lower alkanoyloxy, or lower alkoxycarbonyl; or cyclohexyl.

* * * * *

UNITED STATES PATENT AND TRADEMARK OFFICE
CERTIFICATE OF CORRECTION

PATENT NO. : 4,264,495

DATED : April 28, 1981

INVENTOR(S) : Ronald J. Maner, John G. Fisher, and Max A. Weaver

It is certified that error appears in the above—identified patent and that said Letters Patent is hereby corrected as shown below:

In the heading, change "Maher et al." to ---Maner et al.---.

In the heading at "[75]" change "Ronald J. Maher;" to ---Ronald J. Maner;---.

Signed and Sealed this

Twenty-seventh Day of October 1981

[SEAL]

Attest:

GERALD J. MOSSINGHOFF

Attesting Officer

Commissioner of Patents and Trademarks